United States Patent
Rehwald et al.

(10) Patent No.: US 11,078,875 B2
(45) Date of Patent: Aug. 3, 2021

(54) VIBRATION DAMPING SYSTEM FOR INJECTION SYSTEMS OF MOTOR VEHICLES, IN PARTICULAR FOR FUEL INJECTION SYSTEMS, AND INJECTION SYSTEM INCLUDING SUCH A VIBRATION DAMPING SYSTEM

(71) Applicant: Robert Bosch GmbH, Stuttgart (DE)

(72) Inventors: Andreas Rehwald, Bietigheim-Bissingen (DE); Ralf Weber, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/754,361

(22) PCT Filed: Sep. 20, 2018

(86) PCT No.: PCT/EP2018/075468
§ 371 (c)(1),
(2) Date: Apr. 7, 2020

(87) PCT Pub. No.: WO2019/096467
PCT Pub. Date: May 23, 2019

(65) Prior Publication Data
US 2020/0240377 A1   Jul. 30, 2020

(30) Foreign Application Priority Data
Nov. 15, 2017   (DE) .......................... 102017220328.5

(51) Int. Cl.
*F02M 55/02*   (2006.01)
*F02M 55/04*   (2006.01)
(Continued)

(52) U.S. Cl.
CPC .......... *F02M 55/025* (2013.01); *F02M 61/14* (2013.01); *F02M 55/005* (2013.01);
(Continued)

(58) Field of Classification Search
CPC ...... F02M 55/025; F02M 55/04; F02M 61/14; F02M 2200/302; F02M 2200/85;
(Continued)

(56) References Cited

U.S. PATENT DOCUMENTS

| 4,527,523 A * | 7/1985 | Daumer ................ F02P 5/1455 |
| | | 123/406.24 |
| 5,613,009 A | 3/1997 | Miyazaki et al. |

(Continued)

FOREIGN PATENT DOCUMENTS

EP   1918908 A2   5/2008

OTHER PUBLICATIONS

International Search Report for PCT/EP2018/075468, dated Nov. 12, 2018.

*Primary Examiner* — Erick R Solis
(74) *Attorney, Agent, or Firm* — Norton Rose Fulbright US LLP; Gerard Messina

(57) ABSTRACT

A vibration damping system for injection systems of motor vehicles includes an actively controllable actuator element, which is situated at a component of the injection system. The actuator element is situated at the component in such a way that, during operation of the injection system a vibration reduction of the injection system is achieved with the aid of an active control of the actuator element.

9 Claims, 4 Drawing Sheets

(51) Int. Cl.
*F02M 61/14* (2006.01)
*F02M 55/00* (2006.01)

(52) U.S. Cl.
CPC ... *F02M 2200/09* (2013.01); *F02M 2200/302* (2013.01); *F02M 2200/856* (2013.01); *F02M 2200/858* (2013.01); *F02M 2200/9015* (2013.01)

(58) Field of Classification Search
CPC ....... F02M 2200/856; F02M 2200/858; F02M 2200/9015
USPC .................................................. 123/469, 470
See application file for complete search history.

(56) References Cited

U.S. PATENT DOCUMENTS

| | | | |
|---|---|---|---|
| 6,764,058 B1 * | 7/2004 | Brenk | F02M 45/00 251/48 |
| 7,048,209 B2 * | 5/2006 | Czimmek | F02M 51/0603 123/447 |
| 2008/0103628 A1 * | 5/2008 | Sato | F16F 15/02 700/280 |
| 2010/0071664 A1 | 3/2010 | Hunt et al. | |
| 2011/0217186 A1 * | 9/2011 | Yoshizawa | F02D 41/3082 417/295 |
| 2016/0102620 A1 * | 4/2016 | Ervin | F02D 41/0087 123/345 |
| 2016/0230727 A1 * | 8/2016 | Nankou | F02M 61/18 |

\* cited by examiner

VIBRATION DAMPING SYSTEM FOR INJECTION SYSTEMS OF MOTOR VEHICLES, IN PARTICULAR FOR FUEL INJECTION SYSTEMS, AND INJECTION SYSTEM INCLUDING SUCH A VIBRATION DAMPING SYSTEM

FIELD

The present invention relates to a vibration damping system for injection systems of motor vehicles, in particular fuel injection systems, at least one metering valve being connected to a fluid-conducting component. The present invention specifically relates to the field of fuel injection systems for mixture-compressing, spark ignition internal combustion engines.

BACKGROUND INFORMATION

A device for reducing noise for a fuel injection system is described in U.S. Patent Application Pub. No. US 2010/0071664 A1. Here, noise caused by vibrations of a fuel rail is reduced. An isolation element is provided for this purpose, which is situated, for example, between a holder and a cylinder head or a cup and the cylinder head. The isolator may be made of rubber, an elastomer, a synthetic polymer or the like. The isolator results in damping of the vibration transmission to the cylinder head.

Today, reducing engine noise is not only significant with respect to noise perceptible from the vehicle passenger compartment. Within the scope of a sales talk, a customer may perceive certain engine noise, in particular, with an open engine hood, to be undesirable when the engine is idling. This relates, in particular, to metallic contact surfaces in the suspension of the fuel injectors. Furthermore, it may be assumed that such undesirable noise is at least subjectively perceived to be louder with rising fuel pressure.

SUMMARY

An example vibration damping system according to the present invention and an example injection system according to the present invention may have the advantage that an improved reduction of noise is made possible. In particular, in contrast to passive measures for vibration damping, as they are implementable by passive isolation elements, damping in other and/or broader frequency ranges may be made possible.

The measures described herein allow advantageous refinements of the vibration damping system and of the injection system of the present invention.

The component at which the actively controllable actuator element is situated may be configured as a fluid-conducting component, as a metering valve, as a holder, as an attachment part or as another part of the injection system. It is also possible for multiple actively controllable actuator elements to be provided, which are not necessarily situated at a single component. In this way, an optimal vibration reduction in relation to a given complexity, in particular, the number of actuator elements and the related requirements with regard to the control unit, may be implemented with respect to the particular application case. For example, in the case of an injection system including multiple metering valves, an actively controllable actuator element may be assigned to each metering valve. In particular, an actively controllable actuator element may be installed in each suspension serving for a metering valve.

Specifically, the vibration damping system and the injection system are suitable for applications for fuel injection, in particular, fuel direct injection. A fluid-conducting component is then designed as a fuel-conducting component. A metering valve is then designed as a fuel injector. The advantages and the refinement described based on these preferred applications, however, may also be used in general with injection systems and with vibration damping systems for injection systems of motor vehicles in a corresponding manner.

The fuel-conducting component is preferably designed as a fuel distributor for this purpose, in particular, as a fuel distributor rail. Such a fuel distributor may, on the one hand, be used to distribute the fuel among multiple fuel injectors, in particular, high pressure injectors. On the other hand, the fuel distributor may be used as a shared fuel reservoir for the fuel injectors. The fuel injectors are then preferably connected via corresponding suspensions to the fuel distributor. During operation, the fuel injectors then inject the fuel required for the combustion process under high pressure into the particular combustion chamber. The fuel is compressed in the process with the aid of a high pressure pump and is delivered via a high pressure line into the fuel distributor in a quantity-controlled manner.

Whereas passive vibration damping systems may frequently only be set to certain frequency ranges in their sphere of action, which is possible by design or material-related measures, the vibration damping system including one or multiple actively controllable actuator element(s) may achieve effective vibration damping, in particular, across wide frequency ranges. According to a refinement of the present invention, for example, an active regulation may advantageously be enabled in the process, stiffness and/or path changes advantageously being able to be adapted to the instantaneously present operating situation. In this way, for example, effective vibration damping may be achieved under operating conditions of an internal combustion engine. The actuator element may be implemented as a piezoelectric element, for example. Furthermore, the actively configured vibration damping system may not only be used to reduce vibrations and related sound emission, but may also enable a detection of the instantaneous system state. For example, a reduction in the system stiffness, which is caused, for example, by the failure of a holder, may be identified. It is also possible, for example, to detect changes at active elements, in particular, of a metering valve, such as wear. In this way, faults which occur may also be identified with the aid of the control unit.

Advantageous systems of at least one actively controllable actuator element of the present invention are possible. Vibration reductions corresponding to a parallel, serial and/or absolute integration into a spring-mass damper system may be achieved in the process.

With the aid of an advantageous refinement in accordance with the present invention, in particular, a vibration damping system for a fuel injection system including a fuel distributor, in particular, a fuel distributor rail, may be made possible.

In this way, in particular, an active vibration regulation may be implemented, which allows the sound emission to be damped more deliberately and effectively compared to conventional passive measures, if necessary a monitoring of the structure, and thus an early identification with respect to potential failures, being additionally made possible. In this way, an intelligent acoustic monitoring and/or a load data detection during operation is/are also possible, whereby also applications for the refinement of the design are possible. It is furthermore possible that, in this way, design-relevant vibration loads are deliberately suppressed.

BRIEF DESCRIPTION OF THE DRAWINGS

Preferred exemplary embodiments of the present invention are described in greater detail in the description below with reference to the figures, in which corresponding elements are provided with concurrent reference numerals.

DETAILED DESCRIPTION OF EXAMPLE EMBODIMENTS

Figure 1:
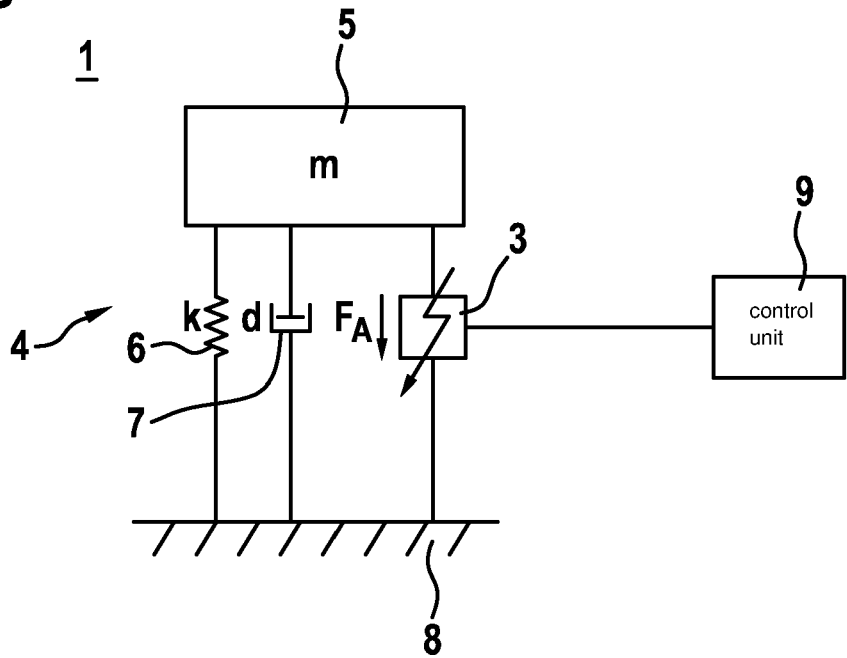
FIG. 1 shows a vibration damping system corresponding to a first possible embodiment in a schematic representation, an actively controllable actuator element being integrated in parallel into a spring-mass damping system.

FIG. 1 shows a vibration damping system 1 for an injection system 2 (FIG. 4) of a motor vehicle corresponding to a first possible embodiment in a schematic representation. In this embodiment, an actively controllable actuator element 3 of vibration damping system 1 is integrated in parallel into a spring-mass damping system 4.

Spring-mass damping system 4 includes a component 5 having a mass m, a spring 6 having a spring constant k, and a damper 7 having damping d. In the first embodiment, actuator element 3 is situated in parallel to spring 6 and damper 7, between component 5 and a fixed bearing 8. Vibration damping system 1 additionally includes a control unit 9, which is used to control actuator element 3.

Figure 4:
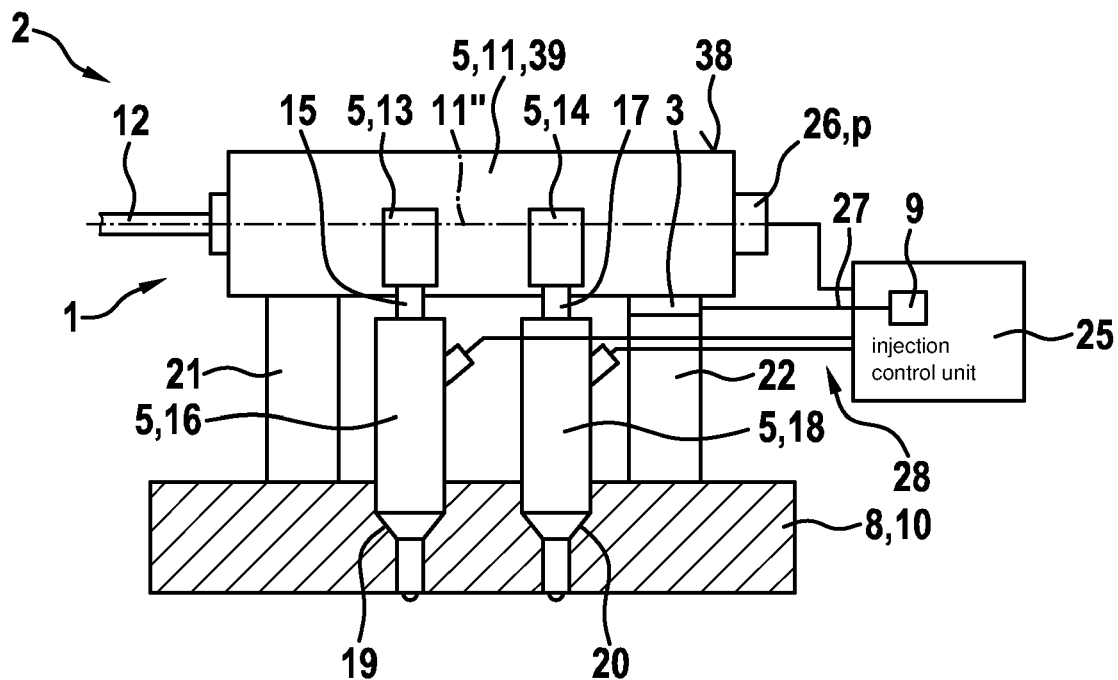
FIG. 4 shows an exemplary embodiment of an injection system in an excerpted, schematic representation according to the first possible embodiment of the vibration damping system.

Actuator element 3 may be designed as a piezoelectric element 3. An inductive or capacitive design or a design functioning based on other mechanisms of action, which allows an active force or path change when an external signal is applied, is also possible. For example, a force $F_A$ may be introduced into spring-mass damping system 4 by actuator element 3. An active regulation may be implemented with respect to operating variables, such as a pressure p (FIG. 4). In this way, an active vibration reduction is made possible.

Figure 2:
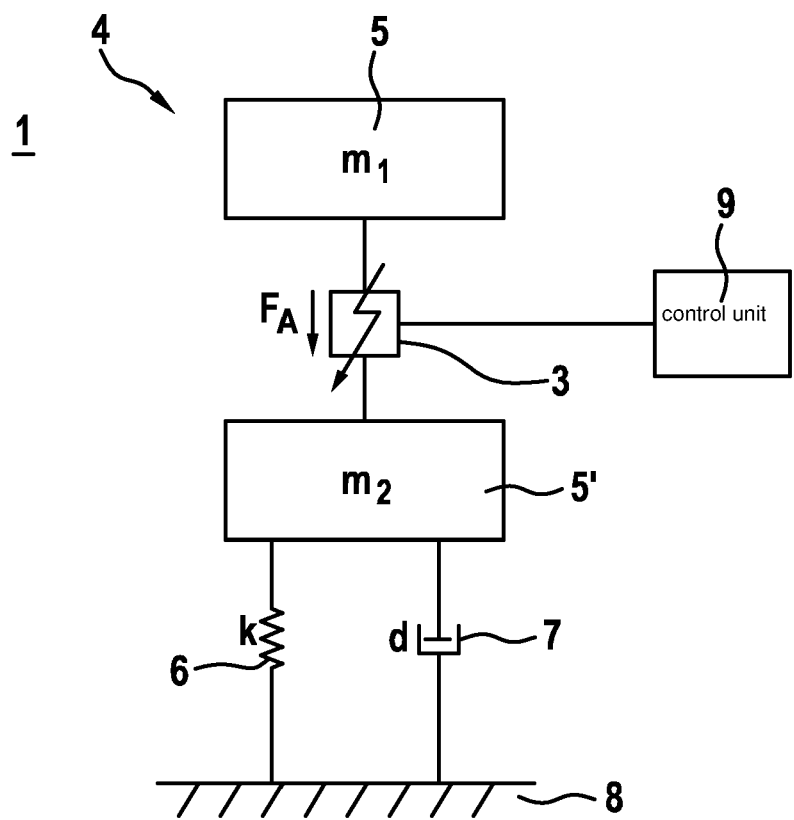
FIG. 2 shows a vibration damping system corresponding to a second possible embodiment in a schematic representation, an actively controllable actuator element being serially integrated into a spring-mass damping system.

FIG. 2 shows a vibration damping system 1 corresponding to a second possible embodiment in a schematic representation, actively controllable actuator element 3 being serially integrated into spring-mass damping system 4. In this embodiment, a component 5 having mass $m_1$ and a component 5' having mass $m_2$ are provided, between which actively controllable actuator element 3 is provided, which may introduce force $F_A$ into spring-mass damping system 4. Component 5' is connected to fixed bearing 8 with the aid of spring 6 and damper 7 situated in parallel to spring 6.

Figure 3:
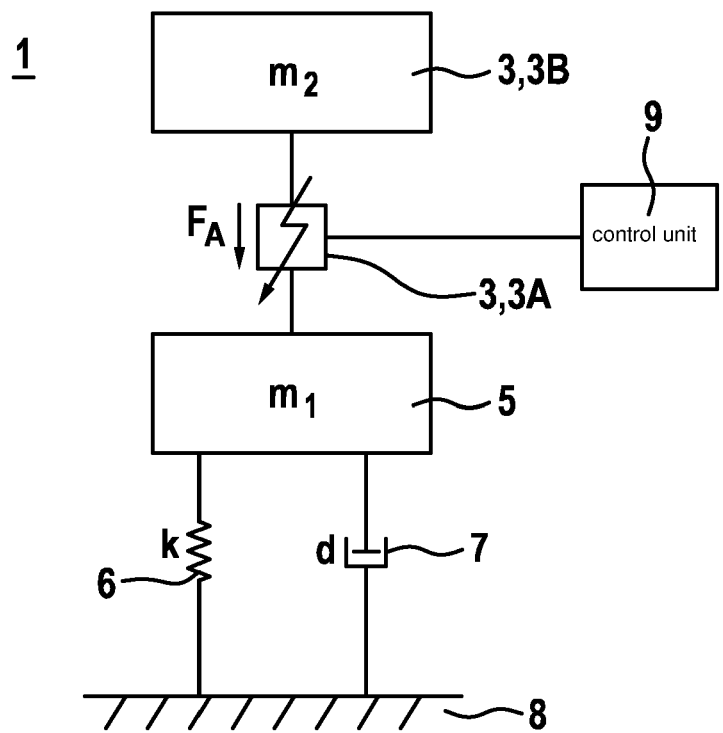
FIG. 3 shows a vibration damping system corresponding to a third possible embodiment in a schematic representation, an actively controllable actuator element being integrated in an absolute manner into a spring-mass damping system.

FIG. 3 shows a vibration damping system 1 corresponding to a third possible embodiment in a schematic representation, actively controllable actuator element 3 being integrated into spring-mass damping system 4 in an absolute manner. Actuator element 3 is divided into a force component 3A and a mass component 3B having mass $m_2$ here. In the schematic representation, mass component 3B illustrates permanent mass $m_2$ of actuator element 3. In the schematic representation, force component 3A illustrates force $F_A$ applied by actuator element 3. Force component 3A of actuator element 3 is situated between mass component 3B and component 5 having mass $m_1$. Component 5 is connected to fixed bearing 8 with the aid of spring 6 and damper 7 connected in parallel to spring 6.

It shall be understood that spring-mass damping systems 4 illustrated in FIGS. 1 through 3 shall be understood as simplified models. In particular, it may be useful in the particular application case to integrate multiple actively controllable actuator elements 3 into a spring-mass damping system 4. A further division of masses m, $m_1$, $m_2$ and accordingly a further division of spring 6 and of damper 7 may be useful.

Figure 5:
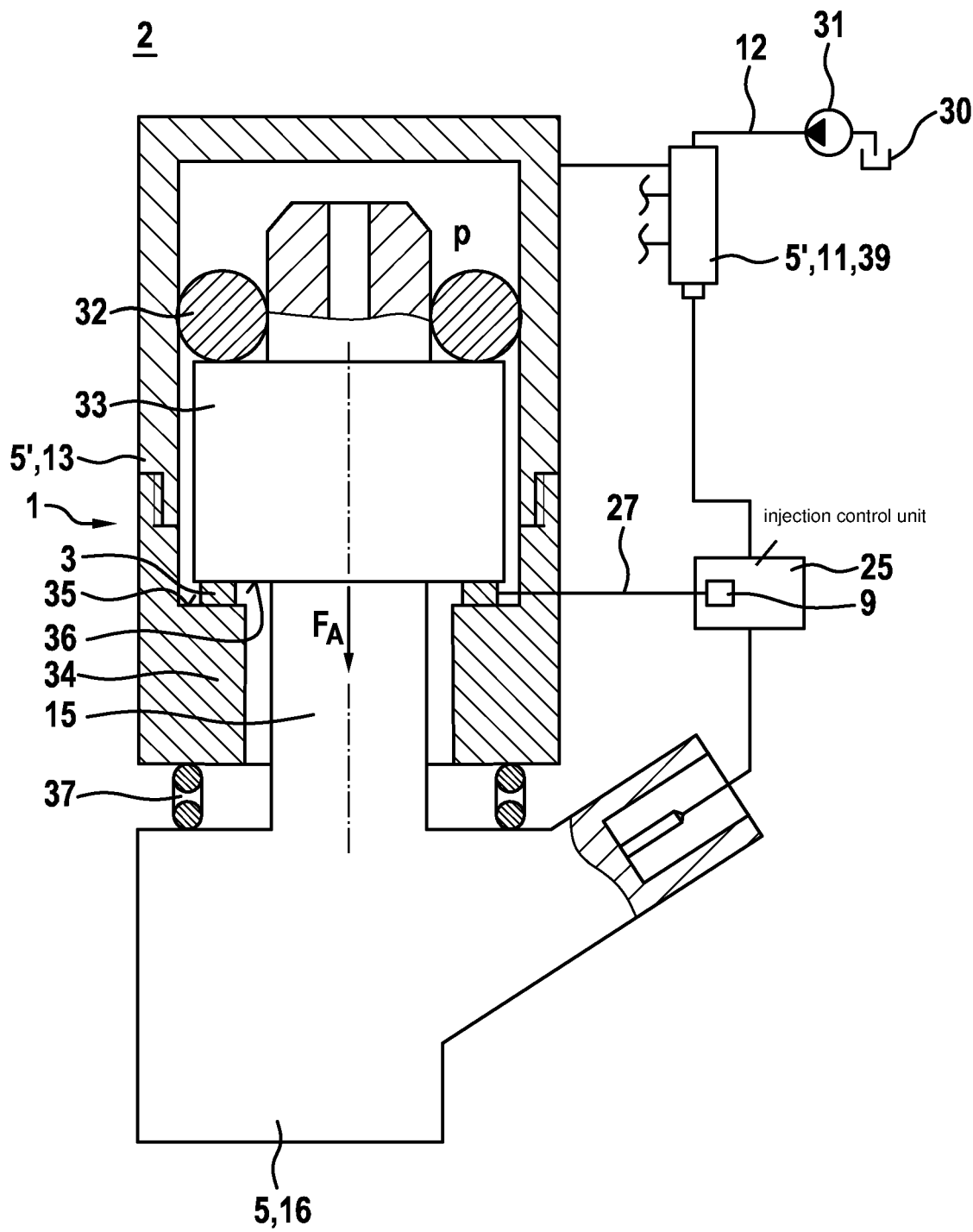
FIG. 5 shows an exemplary embodiment of an injection system in an excerpted, schematic representation according to the second possible embodiment of the vibration damping system.
Figure 6:
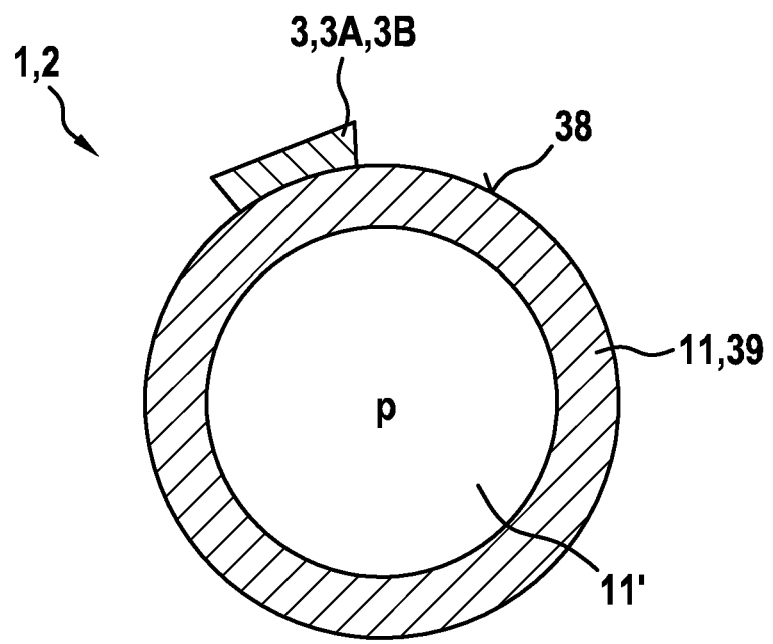
FIG. 6 shows an exemplary embodiment of an injection system in an excerpted, schematic representation according to the third possible embodiment of the vibration damping system.

The assignment of the exemplary embodiments described based on FIGS. 4 through 6 to spring-mass damping systems 4 described based on FIGS. 1 to 3 shall accordingly be understood as a model-related simplification.

FIG. 4 shows an exemplary embodiment of an injection system 2 in an excerpted, schematic representation according to the first possible embodiment of vibration damping system 1 described based on FIG. 1. In this exemplary embodiment, injection system 2 is mounted at a cylinder head 10 of an internal combustion engine of a motor vehicle, which represents fixed bearing 8 here. Injection system 2 includes a fluid-conducting component 11, which is configured as a fuel distributor 11. A feed line 12, with the aid of which fuel is conducted into an interior space 11' (FIG. 6) of fuel distributor 11, is connected at fuel distributor 11. Connecting pieces 13, 14 are provided at fuel distributor 11. A connector 15 of a fuel injector 16 is inserted into connecting piece 13. Furthermore, a connector 17 of a fuel injector 18 is inserted into connecting piece 14. Fuel injectors 16, 18 are additionally inserted into suitable boreholes 19, 20 of cylinder head 10.

In this exemplary embodiment, component 5 having mass m is essentially implemented by fuel distributor 11, connecting pieces 13, 14 and fuel injectors 16, 18. Mass m is connected with the aid of holders 21, 22 to cylinder head 10. Injection system 2 is furthermore described in a simplified manner with the aid of spring 6 having spring constant k and damper 7 having damping d. Actively controllable actuator element 3 is situated between mass m and holder 22. For example, actuator element 3 may be connected in a suitable manner to fuel distributor 11.

Actuator element 3 may also be integrated into holder 22 or be situated between holder 22 and cylinder head 10.

Control unit 9 may be integrated into an injection control unit 25 of injection system 2. For example, injection control unit 25 may detect pressure p inside fuel distributor 11 with the aid of a pressure sensor 26 attached at fuel distributor 11. Injection control unit 25 is furthermore connected to fuel injectors 16, 18 to control fuel injectors 16, 18 for injecting fuel. An electrical line 27, with the aid of which actuator element 3 is connected to injection control unit 25, may be integrated into a wiring harness 28, with the aid of which also the electrical supply of fuel injectors 16, 18 and pressure sensor 26 designed as a high pressure sensor takes place. Algorithms for regulation and their application to the instantaneous systems states may be resumed by suitable and present processor capacities, which are available on injection control unit 25, for example.

In this exemplary embodiment, injection control unit 25 is preferably designed as an engine control unit 25, in which numerous functions are combined. Preferably, all corresponding pieces of information which may be used for the active regulation converge in engine control unit 25. These include, for example, pressure p in fuel distributor 11, a rotational speed of a crankshaft of the engine, and pieces of information about the injection processes of injectors 16, 18. In this way, one or multiple operating variable(s), in particular, pressure p, the rotational speed of a crankshaft of the engine and pieces of information about the injection processes of injectors 16, 18, may be detected and utilized by control unit 9 for controlling at least one actuator element 3.

Actuator element 3 has a suitable shape. For example, actuator element 3 may be configured with a rectangular profile. In particular, actuator element 3 may be configured in the form of a cuboid. Actuator element 3 may also be configured in another manner, in particular, also cylindrically.

FIG. 5 shows an exemplary embodiment of an injection system 2 in an excerpted, schematic representation according to the second possible embodiment of vibration damping system 1 described based on FIG. 2. In this exemplary embodiment, fuel is delivered from a tank 30 into fuel distributor 11 with the aid of a pump system 31. A connector 15 of fuel injector 16 is situated in connecting piece 13 of fuel distributor 11. A seal is implemented between connector 15 and connecting piece 13 with the aid of a sealing ring 32. Sealing ring 32 is supported on a collar 33 of connector 17. Furthermore, a collar 34 on which a projection 35 is formed is provided at connecting piece 13. Actuator element 3 is situated between projection 35 and an end face 36 of connecting piece 13 facing projection 35. Actuator element 3 may be configured, for example, as an annular actuator element 3 having a rectangular profile.

In this exemplary embodiment, component 5 of spring-mass damping system 4, which is illustrated in FIG. 2, is formed by fuel injector 16 including connector 15. Component 5' is formed by fuel distributor 11 and connecting piece 13. It shall be understood that this division into components 5, 5' shall be understood within the meaning of a simplified, specific representation since injection system 2 is modeled in a simplified manner here by two masses, $m_1$, $m_2$, a spring constant k, a damping d and actuator element 3 integrated therein. For example, it may be assumed that no direct contact exists between fuel injector 16 and cylinder head 10. Fuel injector 16 is then held with the aid of a holder 37 and with the aid of pressure p of the fuel, for example. Fuel distributor 11 is connected in a suitable manner to cylinder head 10 (FIG. 4), which may represent fixed bearing 8.

FIG. 6 shows an exemplary embodiment of an injection system 2 in an excerpted, schematic representation according to the third possible embodiment of vibration damping system 1 described based on FIG. 3. In this exemplary embodiment, actuator element 3 is attached at an outer side 38 of fuel distributor 11. Mass component 3B is implemented here by permanent mass $m_2$ of actuator element 3. However, it is also possible for the permanent mass of actuator element 3 to be increased in a suitable manner, for example by a housing part or an additional mass of actuator element 3.

Furthermore, it may be advantageous that multiple actuator elements 3 are situated at fuel distributor 11, which are situated, for example, along a longitudinal axis 11" (FIG. 4) of a tubular base body 39 of fuel distributor 11. Fuel distributor 11 may be connected in a suitable manner to cylinder head 10, which represents fixed bearing 8.

One or more of the described options for arranging actuator elements 3 may be implemented on an injection system 2. The different principles for influencing spring-mass damping systems 4 may be combined in a suitable manner with actuator elements 3 in the process. In principle, spring-mass damping system 4 may be influenced with the aid of at least one actuator element 3 at multiple or all coupling interfaces of an injection system 2 on which structural vibrations are transmitted. An actuator element 3 may also be situated between a holder 22 and cylinder head 10, for example. Furthermore, an actuator element 3 may be situated directly on sound-emitting surfaces, as is described based on outer side 38 of tubular base body 39.

The present invention is not restricted to the described embodiments.

What is claimed is:

1. A vibration damping system for an injection system of a motor vehicle, comprising:
   at least one actively controllable actuator element which is situated at a component of the injection system, the actuator element being situated at the component in such a way that, during operation of the injection system, a vibration reduction of the injection system is achieved using an active control of the actuator element,
   wherein the actively controllable actuator element is situated between a connecting piece of a fluid-conducting component of the fuel injection system and a connector of a metering valve.

2. The vibration damping system as recited in claim 1, further comprising:
   a control unit configured to, during operation of the injection system, actively control the actuator element, the control unit configured in such a way that, during operation of the injection system, the vibration reduction of the injection system is achieved using the active control of the actuator element, which enables a damping of a sound emission of the injection system and/or a reduction of at least one vibration load of the injection system.

3. The vibration damping system as recited in claim 2, further comprising:
   an injection control unit for the injection system, the injection control unit configured to control at least one metering valve of the injection system and/or to detect at least one operating variable of the injection system, the control unit being integrated into the injection control unit, and is configured to controls the actuator element as a function of the control of the metering valve and/or the operating variable of the injection system.

4. The vibration damping system as recited in claim 1, wherein the connector of the metering valve is suspended on the connecting piece of the fluid-conducting component using the actively controllable actuator element.

5. The vibration damping system as recited in claim 1, wherein an additional actively controllable actuator element is situated freely at an outer side of a fluid-conducting component of the fuel injection system.

6. The vibration damping system as recited in claim 1, wherein an additional actively controllable actuator element is supported at an outer side of a fluid-conducting component of the fuel injection system and/or at or in a holder of the injection system.

7. The vibration damping system as recited in claim 6, wherein the additional actively controllable actuator element is supported at the holder which is connected to a fixed bearing, or at a fixed bearing.

8. The vibration damping system as recited in claim 1, wherein the fluid-conducting component is a fluid distributor which is configured to store and/or distribute fluid among multiple metering valves.

9. An injection system for mixture-compressing, spark ignition internal combustion engines, the system comprising:
- at least one fluid-conducting component;
- at least one component configured as a metering valve; and
- a vibration damping system including at least one actively controllable actuator element which is situated at a component of the injection system, the actuator element being situated at the component in such a way that, during operation of the injection system, a vibration reduction of the injection system is achieved using an active control of the actuator element,
wherein the actively controllable actuator element is situated between a connecting piece of a fluid-conducting component of the fuel injection system and a connector of a metering valve.

\* \* \* \* \*